United States Patent
McKenna et al.

(10) Patent No.: US 9,216,903 B2
(45) Date of Patent: Dec. 22, 2015

(54) CONVERSION OF HYDROCARBONS TO CARBON DIOXIDE AND ELECTRICAL POWER

(75) Inventors: Mark McKenna, Stockton on Tees (GB); Peter Edward James Abbott, Eaglescliffe (GB); Peter William Farnell, Stokesley (GB)

(73) Assignee: Johnson Matthey PLC, London (GB)

( * ) Notice: Subject to any disclaimer, the term of this patent is extended or adjusted under 35 U.S.C. 154(b) by 779 days.

(21) Appl. No.: 13/518,276

(22) PCT Filed: Nov. 30, 2010

(86) PCT No.: PCT/GB2010/051991
§ 371 (c)(1),
(2), (4) Date: Sep. 14, 2012

(87) PCT Pub. No.: WO2011/077107
PCT Pub. Date: Jun. 30, 2011

(65) Prior Publication Data
US 2013/0000320 A1    Jan. 3, 2013

(30) Foreign Application Priority Data
Dec. 22, 2009  (GB) .................................. 0922411.4

(51) Int. Cl.
*C01B 3/38* (2006.01)
*F02C 3/28* (2006.01)
(Continued)

(52) U.S. Cl.
CPC . *C01B 3/382* (2013.01); *C01B 3/48* (2013.01); *C01B 3/501* (2013.01); *C01B 3/52* (2013.01);
(Continued)

(58) Field of Classification Search
CPC ............. F02C 3/205; F02C 3/22; F02C 3/26; F02C 3/28; F02C 3/30; F05D 2220/72; F05D 2220/722; F05D 2220/75; F01K 23/06; F01K 23/067; F01K 23/08; Y02E 20/16; Y02E 20/18; F23C 2900/03002
See application file for complete search history.

(56) References Cited

U.S. PATENT DOCUMENTS

| 4,910,228 A | 3/1990 | Lywood |
| 2007/0010590 A1* | 1/2007 | Abbott et al. ................. 518/703 |

(Continued)

FOREIGN PATENT DOCUMENTS

| GB | 1 578 270 | 11/1980 |
| WO | WO-97/05947 A1 | 2/1997 |

(Continued)

OTHER PUBLICATIONS

Nord et al., "Design and off-design analyses of a pre-combustion $CO_2$ capture process in a natural gas combined cycle power plant," *International Journal of Greenhouse Gas Control*, 2009, vol. 3, pp. 385-392.

(Continued)

*Primary Examiner* — Phutthiwat Wongwian
*Assistant Examiner* — Marc Amar
(74) *Attorney, Agent, or Firm* — RatnerPrestia

(57) ABSTRACT

A process for the conversion of a hydrocarbon to $CO_2$ and electrical power is described which includes subjecting a gas mixture of a hydrocarbon feed stream and steam to an integrated reforming process including stages of steam reforming in a gas-heated reformer and secondary reforming to generate a reformed gas mixture, increasing the hydrogen content of the reformed gas mixture by subjecting it to one or more water-gas-shift stages, cooling the resulting hydrogen-enriched reformed gas and separating condensed water therefrom, passing the resulting de-watered hydrogen-enriched reformed gas to one or more stages of carbon dioxide separation to recover carbon dioxide, combusting the remaining hydrogen-containing fuel stream with an oxygen containing gas in a gas turbine to generate electrical power and passing the exhaust gas mixture from the gas turbine to a heat recovery steam generation system that feeds one or more steam turbines to generate additional electrical power.

17 Claims, 1 Drawing Sheet

(51) Int. Cl.
    *F01K 23/06*    (2006.01)
    *C01B 3/48*     (2006.01)
    *C01B 3/50*     (2006.01)
    *C01B 3/52*     (2006.01)
    *C01B 31/20*    (2006.01)
    *F01K 17/06*    (2006.01)
    *F01K 23/10*    (2006.01)

(52) U.S. Cl.
    CPC ............... *C01B 31/20* (2013.01); *F01K 17/06* (2013.01); *F01K 23/067* (2013.01); *F01K 23/10* (2013.01); *F02C 3/28* (2013.01); *C01B 2203/0233* (2013.01); *C01B 2203/0244* (2013.01); *C01B 2203/0283* (2013.01); *C01B 2203/0288* (2013.01); *C01B 2203/043* (2013.01); *C01B 2203/0405* (2013.01); *C01B 2203/0415* (2013.01); *C01B 2203/0495* (2013.01); *C01B 2203/06* (2013.01); *C01B 2203/0811* (2013.01); *C01B 2203/0838* (2013.01); *C01B 2203/0866* (2013.01); *C01B 2203/0883* (2013.01); *C01B 2203/0888* (2013.01); *C01B 2203/0894* (2013.01); *C01B 2203/1011* (2013.01); *C01B 2203/1047* (2013.01); *C01B 2203/1058* (2013.01); *C01B 2203/1076* (2013.01); *C01B 2203/1082* (2013.01); *C01B 2203/127* (2013.01); *C01B 2203/1235* (2013.01); *C01B 2203/1241* (2013.01); *C01B 2203/1294* (2013.01); *C01B 2203/143* (2013.01); *C01B 2203/148* (2013.01); *C01B 2203/84* (2013.01); *F05D 2220/72* (2013.01); *F05D 2220/722* (2013.01); *F05D 2220/75* (2013.01)

(56) References Cited

U.S. PATENT DOCUMENTS

| | | |
|---|---|---|
| 2007/0130957 A1 | 6/2007 | Hoffmann et al. |
| 2008/0155984 A1 | 7/2008 | Liu et al. |
| 2009/0115190 A1* | 5/2009 | Devine ..................... 290/44 |

FOREIGN PATENT DOCUMENTS

| | | |
|---|---|---|
| WO | WO-02/48027 A1 | 6/2002 |
| WO | WO-03/062142 A1 | 7/2003 |
| WO | WO-2008/074980 A1 | 6/2008 |
| WO | WO 2008074980 A1 * | 6/2008 |

OTHER PUBLICATIONS

Corradetti et al., "Analysis of Gas-Steam Combined Cycles With Natural Gas Reforming and CO2 Capture," *Journal of Engineering for Gas Turbines and Power*, Jul. 2005, vol. 127, pp. 545-552.
International Search Report dated Jan. 28, 2011, from PCT International Application No. PCT/GB2010/051991.

* cited by examiner

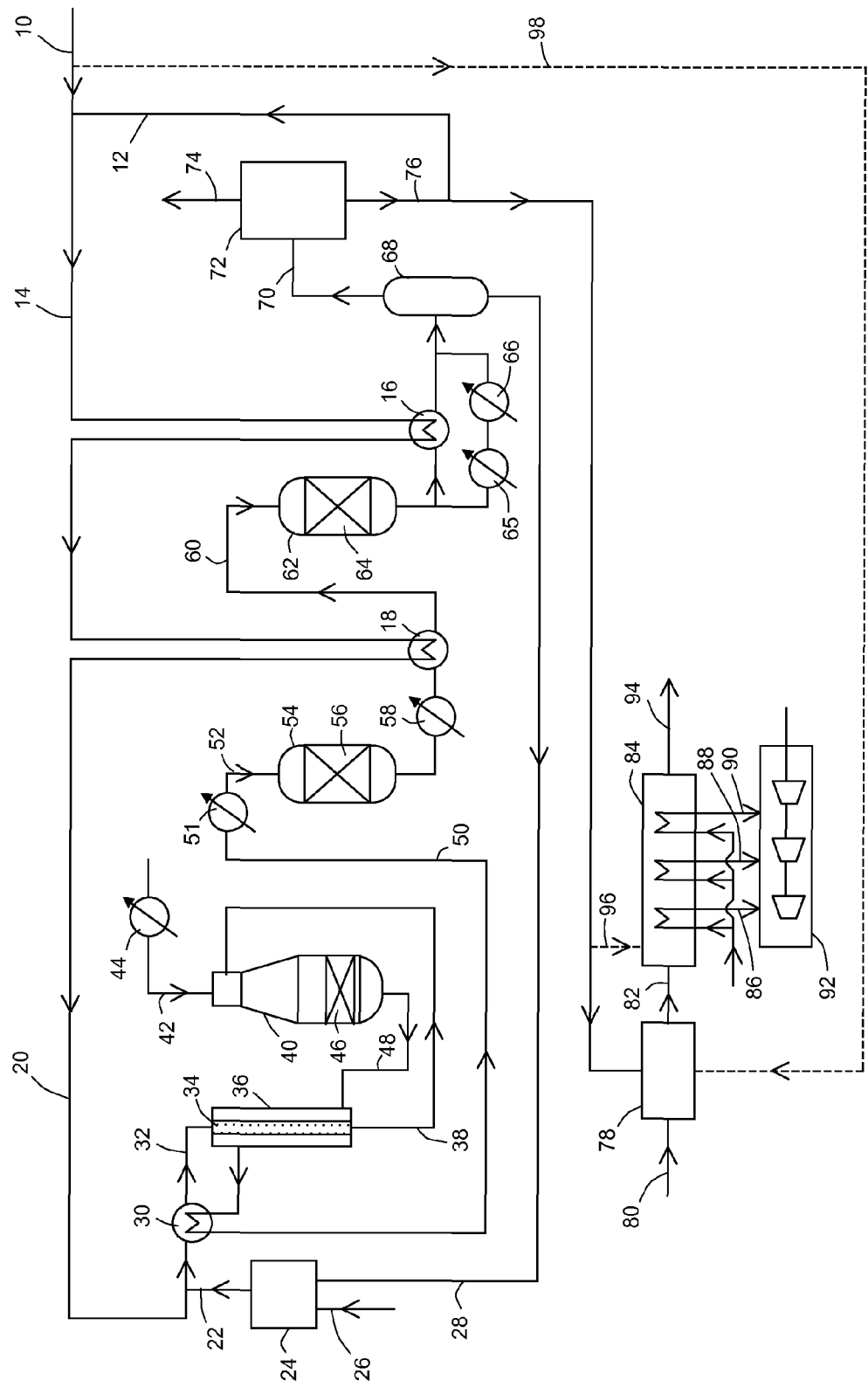

US 9,216,903 B2

CONVERSION OF HYDROCARBONS TO CARBON DIOXIDE AND ELECTRICAL POWER

CROSS-REFERENCE TO RELATED APPLICATIONS

This application is the U.S. National Phase application of PCT International Application No. PCT/GB2010/051991, filed Nov. 30, 2010, and claims priority of British Patent Application No. 0922411.4, filed Dec. 22, 2009, the disclosures of both of which are incorporated herein by reference in their entireties for all purposes.

FIELD OF THE INVENTION

This invention relates to processes for the conversion of hydrocarbons, such as natural gas, to carbon dioxide and electrical power.

BACKGROUND OF THE INVENTION

Processes for converting natural gas to $CO_2$ and electricity via so-called natural gas combined cycle (NGCC) processes are becoming increasingly important as power producers seek routes to reduce carbon dioxide emissions.

US 2008/0155984 discloses a process for producing power and partially capturing $CO_2$ comprising stream reforming in a pre-steam-methane reformer a mixture of hydrocarbon and steam at <800° C. to form a first reformate stream, subjecting the first reformate stream to the water-gas shift reaction to form a second reformate stream having an increased hydrogen content, removing a portion of $CO_2$ from the second reformate stream to generate a third reformate stream (wherein <50% of the carbon in the first reformate stream is removed), combusting the third reformate stream in a gas turbine to generate power and an exhaust gas stream, utilizing heat in the exhaust gas stream in a heat recovery steam generator to generate steam, and using the steam to generate additional power.

This process has the drawback that the steam reforming reactions are endothermic and consume considerable amounts of energy that would better be converted to power. Indeed in the aforesaid US 2008/0155984, the inventors have sought to overcome this drawback by performing the steam reforming reactions in the heat recovery steam generator.

WO 2008/074980 discloses a process for the production of $CO_2$ in concentrated form and electricity from a hydrocarbon feedstock using autothermal reforming whereby a methane-containing stream at 300-700° C. is fed to an autothermal reformer (ATR) in which it is partially combusted with air and optionally steam at an $O_2$:C ratio in the range 0.45-0.85:1, to generate a synthesis gas comprising hydrogen, carbon oxides, nitrogen and steam, subjecting the synthesis gas to the water-gas shift reaction, removing carbon dioxide from the shifted gas mixture to form a fuel mixture comprising hydrogen and nitrogen and combusting at least part of the fuel mixture in a gas turbine.

Another ATR-based process is described in a paper entitled "Analysis of gas-steam combined cycles with natural gas reforming and $CO_2$ capture" by A. Corradetti & U. Desideri, published in the Journal of Engineering for Gas Turbines & Power, Jul. 2005, 127, pages 545-552.

These ATR-based processes have the drawback that the ATR generates considerable amounts of heat energy, generally in excess of the process requirements, which is then wasted. Indeed the processes described in WO2008/074980 and the JEGT & P paper seek to overcome this problem by heat exchanging the synthesis gas stream and shifted gas streams with a variety of feeds in an attempt to improve the overall process efficiency. The use of air as the primary oxidant in autothermal reforming and the complexity of the additional heat exchange requirements increases the equipments size and cost. Moreover, in the ATR flowsheet it would not appear possible to readily adapt the process for less than 100% $CO_2$ capture.

SUMMARY OF THE INVENTION

We have developed a process in which the energy demands of the steam reforming process are met, whilst at the same time simplifying the heat exchange demands and improving the flexibility of the ATR process.

Accordingly the invention provides a process for the conversion of a hydrocarbon to $CO_2$ and electrical power comprising the steps of:
(i) subjecting a gas mixture comprising a hydrocarbon feed stream and steam to steam reforming by passing the mixture over a catalyst disposed in externally-heated tubes in a gas-heated reformer to form a primary reformed gas,
(ii) partially combusting the primary reformed gas with an oxygen-containing gas and bringing the resultant partially combusted gas towards equilibrium over a secondary reforming catalyst in an secondary reformer to form a secondary reformed gas mixture comprising hydrogen, steam and carbon oxides,
(iii) passing the secondary reformed gas to the gas-heated reformer to heat the tubes therein and partially cool the reformed gas mixture,
(iv) increasing the hydrogen content of the partially cooled reformed gas mixture by subjecting it to one or more water-gas-shift stages thereby producing a hydrogen enriched reformed gas,
(v) cooling the hydrogen-enriched reformed gas to below the dew point of the steam therein to condense water and separating condensed water to give a de-watered hydrogen-enriched reformed gas,
(vi) passing the de-watered hydrogen-enriched reformed gas to one or more stages of carbon dioxide separation to generate a carbon dioxide stream and a hydrogen-containing fuel stream, and
(vii) combusting the hydrogen-containing fuel stream with an oxygen containing gas in a gas turbine to generate electrical power and an exhaust gas mixture, and passing the exhaust gas mixture to a heat recovery steam generation system to provide steam for one or more steam turbines to generate additional electrical power.

The integrated gas-heated/secondary reforming process offers improved CAPEX and efficiency gains versus the known steam reforming- and ATR-based processes. The process may also be designed such that a portion of the hydrocarbon feed stream may be fed directly to the gas turbine. In this way, the process may be used flexibly so that the overall process gaseous $CO_2$ emissions may be within pre-determined emission limits.

BRIEF DESCRIPTION OF THE DRAWING

The invention is illustrated by reference to the accompanying drawing in which; FIG. 1 is a diagrammatic flowsheet of one embodiment of the invention.

DETAILED DESCRIPTION OF THE INVENTION

In the process of the invention the hydrocarbon feedstock may be any gaseous or low boiling hydrocarbon feedstock such as natural gas, associated gas, LPG, petroleum distillate or naphtha. It is preferably methane, associated gas or natural gas containing a substantial proportion, e.g. over 85% v/v methane. Natural gas is an especially preferred feedstock. The feedstock is typically compressed to a pressure in the range 10-100 bar abs. If the feedstock contains sulphur compounds, before, or preferably after, compression the feedstock is subjected to desulphurisation, e.g. hydrodesulphurisation using Co or Ni catalysts and absorption of hydrogen sulphide using a suitable absorbent, e.g. a zinc oxide bed. To facilitate this and/or reduce the risk of carbon laydown in the reforming process, hydrogen is preferably added to the hydrocarbon feedstock. The amount of hydrogen in the resulting mixed gas stream may be in the range 1-20% vol, but is preferably in the range 1-10%, more preferably in the range 1-5%. In a preferred embodiment a portion of the hydrogen-containing fuel stream is mixed with the hydrocarbon feed stream. The hydrogen stream may be combined with the hydrocarbon upstream and/or downstream of any hydrodesulphurisation stage.

The feedstock is also preheated. Various hot gas sources are provided in the present process. However in a preferred embodiment, the hydrocarbon feed stream is heated by heat exchange with the hydrogen-enriched reformed gas mixture.

The hydrocarbon stream is mixed with steam: this steam introduction may be effected by direct injection of steam and/or by saturation of the feedstock by contact of the latter with a stream of heated water. One or more saturators may be used. In a preferred embodiment, a portion of the hydrocarbon stream bypasses the steam addition, e.g. the saturator. The amount of steam introduced may be such as to give a steam ratio of 1 to 3, preferably 1 to 2, i.e. 1 to 2 moles of steam per gram atom of hydrocarbon carbon in the feedstock. The amount of steam is preferably minimised as this leads to a lower cost, more efficient process. It is preferred that the steam ratio is $\leq 1.5$.

The hydrocarbon/steam mixture is then desirably preheated prior to reforming. This may be achieved by the use of a feed-effluent heat exchanger, with the mixture being heated by the partially cooled reformed gas mixture. Desirably, the mixed stream is heated to 400-500° C., preferably 440-460° C.

The resultant feedstock/steam mixture is then subjected to reforming comprising primary steam reforming and secondary reforming. In the present invention, the primary reforming is effected using a gas-heated reformer. In one type of gas-heated reformer, the catalyst is disposed in tubes extending between a pair of tube sheets through a heat exchange zone. Reactants are fed to a zone above the upper tube sheet and pass through the tubes and into a zone beneath the lower tube sheet. The heating medium is passed through the zone between the two tube sheets. Gas-heated reformers of this type are described in GB 1 578 270 and WO 97/05 947. Another type of gas-heated reformer that may be used is a double-tube gas-heated reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. The external surface of the outer tubes is heated by the secondary reformed gas. The reactant mixture is fed to the end of the outer tubes remote from said closed end so that the mixture passes through said annular space and undergoes steam reforming and then passes through the inner tube.

The compressed, heated hydrocarbon and steam mixture is passed through the catalyst-filled tubes in the gas-heated reformer. During passage through the reforming catalyst, the endothermic reforming reaction takes place with the heat required for the reaction being supplied from the secondary reformed gas flowing past the exterior surface of the tubes. The primary reforming catalyst is usually nickel supported on a refractory support such as rings or multi-holed pellets of calcium aluminate cement, alumina, titania, zirconia and the like. Alternatively a combination of a nickel and precious metal catalyst may be used. For example, a portion of the nickel catalyst may be replaced with a precious metal catalyst, such as a ruthenium-based catalyst. For reasons of economy, preferably less than 20% by volume of the nickel-based catalyst may be replaced by such a precious metal catalyst.

The temperature of the secondary reformed gas is preferably sufficient that the gas undergoing primary reforming leaves the catalyst at a temperature in the range 650-850° C., preferably 720-780° C., more preferably 740-760° C.

In the present invention the primary reformed gas, which comprises methane, hydrogen, steam and carbon oxides, is fed preferably without any dilution or heat exchange, to an autothermal or secondary reformer in which it is subjected to secondary reforming.

The autothermal reformer will generally comprise a burner disposed at the top of the reformer, to which is fed the primary reformed gas and an oxygen-containing gas, a combustion zone beneath the burner through which a flame extends above a fixed bed of particulate steam reforming catalyst. In autothermal or secondary reforming, the heat for the endothermic steam reforming reactions is therefore provided by combustion of hydrocarbon in the feed gas. The primary reformed gas is typically fed to the top of the reformer and the oxygen-containing gas fed to the burner, mixing and combustion occur downstream of the burner generating a heated gas mixture which is brought to equilibrium as it passes through the steam reforming catalyst. Whereas some steam may be added to the oxygen containing gas, preferably no steam is added so that the low overall steam ratio for the reforming process is achieved. The secondary reforming catalyst is usually nickel supported on a refractory support such as rings or pellets of calcium aluminate cement, alumina, titania, zirconia and the like. In a preferred embodiment, the secondary reforming catalyst comprises a layer of a higher activity Ni and/or Rh on zirconia catalyst over a conventional Ni on alumina catalyst to reduce catalyst support volatilisation.

The oxygen-containing gas may be substantially pure oxygen, air, or an oxygen-enriched air mixture; however in the present invention, it is preferably air. Using air alone removes the need for a costly and energy demanding air separation unit (ASU).

The amount of oxygen-containing gas required in the secondary reformer is determined by two main considerations, viz. the desired composition of the product gas, and the heat balance of the gas-heated reformer. In general, increasing the amount of oxygen, thereby increasing the temperature of the reformed gas leaving the secondary reformer, causes the [$H_2$]/[CO] ratio to decrease and the proportion of carbon dioxide to decrease. Alternatively, if the conditions are arranged such that the product composition and temperature is kept constant, increasing the temperature at which the feedstock is fed to the gas-heated reformer decreases the amount of oxygen required (at a constant oxygen feed temperature).

The amount of oxygen-containing gas added is preferably such that 40 to 60 moles of oxygen are added per 100 gram atoms of hydrocarbon feedstock fed to the primary and secondary reforming stages. Preferably the amount of oxygen added is such that the secondary reformed gas leaves the secondary reforming catalyst at a temperature in the range 800-1050° C., more preferably 900-1000° C., most preferably 920-990° C. For a given feedstock/steam mixture, amount and composition of the oxygen-containing gas and reforming pressure, this temperature largely determines the composition of the secondary reformed gas.

The secondary reformed gas is then used to provide the heat required for the primary reforming step by using the secondary reformed gas as the hot gas flowing past the tubes of the gas-heated reformer. During this heat exchange the secondary reformed gas cools by transferring heat to the gas undergoing primary reforming. Preferably the secondary reformed gas cools by several hundred degrees Centigrade but of course it will leave the gas-heated reformer at a temperature somewhat above the temperature at which the feedstock/steam mixture is fed to the gas-heated reformer. Preferably the secondary reformed gas leaves the gas-heated reformer at a temperature in the range 500-650° C., more preferably 540-580° C.

After leaving the gas-heated reformer, the secondary reformed gas is then further cooled in one or more steps of heat exchange.

Heat recovered during this cooling may be employed for reactants pre-heating and/or for heating water used to provide the steam employed in the primary reforming step. As described hereinafter, the recovered heat may additionally, or alternatively, be used in the carbon dioxide separation step. In a preferred embodiment, the secondary reformed gas mixture exiting the shell side of the gas-heated reformer is used to preheat the feedstock/steam mixture fed to the tubes in the gas-heated reformer.

The secondary reformed gas comprises hydrogen, carbon monoxide, carbon dioxide, steam, a small amount of unreacted methane, and where air is used as oxidant, nitrogen and a small amount of argon. Preferably the hydrogen content of the secondary reformed gas is in the range 30-40% vol and the CO content in the range 5-15% vol. In the present invention, the hydrogen content of the partially cooled reformed gas mixture is increased by subjecting it to one or more water-gas-shift stages thereby producing a hydrogen enriched reformed gas and at the same time converting carbon monoxide to carbon dioxide. The reaction may be depicted as follows;

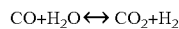

$$CO + H_2O \leftrightarrow CO_2 + H_2$$

Because primary steam reforming is performed with an excess of steam it is generally not necessary to add steam to the secondary reformed gas mixture to ensure sufficient steam is available for the water gas shift reaction. However if desired, steam may be introduced into the secondary reformed gas upstream of the shift stage.

Whereas one shift stage employing a suitably stable and active shift catalyst may be employed, the partially cooled reformed gas is preferably subjected to two or more water gas shift stages comprising high temperature shift, medium temperature shift and low temperature shift. In this way the favourable equilibrium at low temperature may be used to maximise hydrogen formation, along with conversion of carbon monoxide to carbon dioxide. By using two or more shift stages, extremely low CO levels in the shifted gas are possible.

High temperature shift is conventionally operated adiabatically at with inlet temperatures in the range 340-360° C. over a reduced iron catalyst, such as chromic-promoted magnetite.

Medium and low temperature shift stages may be performed using supported copper-catalysts, particularly the known copper/zinc oxide/alumina compositions. In low temperature shift, a gas containing carbon monoxide (preferably ≤6% v/v on a dry basis) and steam (steam to total dry gas molar ratio typically in range 0.3 to 1.5) is passed over the catalyst in an adiabatic fixed bed at an outlet temperature in the range 200 to 300° C. at a pressure in the range 15-50 bar abs. Usually the inlet gas is the product of "high temperature shift" in which the carbon monoxide content has been decreased by reaction over an iron-chromia catalyst at an outlet temperature in the range 400 to 500° C., followed by cooling by indirect heat exchange. The outlet carbon monoxide content is typically in the range 0.1 to 1.5%, especially under 0.5% v/v on a dry basis id additional steam is added.

Alternatively in medium temperature shift, the gas containing carbon monoxide and steam is fed at a pressure in the range 15-50 bar abs to the catalyst at an inlet temperature typically in the range 200 to 240° C. although the inlet temperature may be as high as 280° C., and the outlet temperature is typically up to 300° C. but may be as high as 360° C.

Adiabatic operation of the shift stages results in an increase in the temperature of the shifted gas mixtures and subsequent heat exchange with one or more process fluids is generally desirable. Where the shift stage comprises a high temperature shift stage, two stages of heat exchange are preferable; in the first stage the hot shifted gas mixture may be cooled by heat exchange with water under pressure, followed by heat exchange with the hydrocarbon feed stream. Similarly, where the shift stage comprises a medium-temperature or low-temperature shift stage, at least a portion of the hot shifted gas is cooled by heat exchange with the hydrocarbon feed stream.

Whereas the low temperature- and medium-temperature shift reactions may be operated adiabatically it is also possible to operate them isothermally, i.e. with heat exchange in the shift converter such that the reaction in the catalyst bed occurs in contact with heat exchange surfaces. The coolant conveniently may be water under such a pressure such that partial, or complete, boiling takes place. A suitable pressure is 15 to 50 bar abs and the resulting steam can be used, for example, to drive a turbine or to provide process steam for shift, or for an upstream stage in which the shift feed gas is generated. The water can be in tubes surrounded by catalyst or vice versa.

Following the one or more shift stages, the hydrogen enriched reformed gas is cooled to a temperature below the dew point so that the steam condenses. The condensed steam may then be separated using one or more, e.g. two, conventional separators. The cooling to effect condensation of the steam may be effected by contacting the shifted gas with a stream of cold water: as a result a stream of heated water is formed which may be used to supply some or all of the steam required for reforming. Preferably, the condensed water is fed to a steam generator such as a steam stripper or saturator to provide at least a portion of the steam required for steam reforming. Because the condensate may contain ammonia, methanol, hydrogen cyanide and $CO_2$, returning the steam generator offers a useful way of returning hydrogen and carbon to the process.

Typically the shifted gas contains 10 to 20% by volume of carbon dioxide (on a dry basis). In the present invention, after separation of the condensed water, carbon dioxide is separated from the resulting de-watered shifted gas. The carbon dioxide separation stage may be performed using an amine- or physical wash-solvent system. Alternatively the carbon dioxide separation stage may be performed using a membrane system or a pressure swing adsorption system.

The carbon dioxide may be separated by a conventional acid gas recovery (AGR) process. In the conventional AGR process the dewatered hydrogen-enriched shifted gas is contacted with a stream of a suitable absorbent liquid, such as an amine, particularly methyl diethanolamine (MDEA) solution so that the carbon dioxide is absorbed by the liquid to give a laden absorbent liquid and a gas stream having a decreased content of carbon dioxide. The laden absorbent liquid is then regenerated, for example by heating, to desorb the carbon dioxide and to give a regenerated absorbent liquid, which is then recycled to the carbon dioxide absorption stage. If the carbon dioxide separation step is operated as a single pressure process, i.e. essentially the same pressure is employed in the absorption and regeneration steps, only a little recompression of the recycled carbon dioxide will be required. Unless it is desired that the product gas has a very low carbon dioxide content, it is generally not necessary to effect the regeneration of the absorbent liquid to a very low carbon dioxide content.

Alternatively, suitable membrane technology for separation of $CO_2$ is commercially available and may be used to generate very pure $CO_2$ streams, e.g. >95% vv $CO_2$, preferably >98% v/v $CO_2$.

The recovered carbon dioxide, e.g. from the AGR process or membrane separator, may compressed and used for the manufacture of chemicals, or sent to storage and/or used in enhanced oil recovery (EOR) processes. In cases where the $CO_2$ is to be compressed for storage, transportation or use in EOR processes, the $CO_2$ is preferably first dried to prevent liquid water present in trace amounts, from condensing. The $CO_2$ is preferably dried to a dew point $\leq -10°$ C. by passing it through a bed of a suitable desiccant, such as a zeolite, or contacting it with a glycol in a glycol drying unit.

If desired, a portion of the recovered carbon dioxide may be recycled to the primary reforming step. The recycled carbon dioxide stream may be added to the feedstock prior to feeding the latter to the gas-heated reformer or to the secondary reformer feed stream before the latter is fed to the secondary reforming step. Where the recycled carbon dioxide is added to the primary reformed gas, rather than to the feedstock prior to primary reforming, there is an advantage that the primary reforming process can be operated at a lower steam ratio.

Subsequent to the stage of carbon dioxide separation, before the de-watered hydrogen enriched shifted gas is passed to the gas turbine, at least a portion of it may be subjected to a step of hydrogen separation, e.g. through a membrane in order to provide pure hydrogen for hydrodesulphurisation of the hydrocarbon feed or to add to the hydrocarbon upstream of the primary reforming stage.

The separation and recovery of the carbon dioxide produces a hydrogen-containing fuel stream comprising principally hydrogen and, where air is used as oxidant in the secondary reforming step, nitrogen, with small amounts of residual steam, methane, carbon monoxide and carbon dioxide. The hydrogen content is desirably in the range 55-65% vol. In the present invention, at least part of the hydrogen containing fuel stream is mixed with an oxygen-containing gas such as air or oxygen-enriched air and combusted in a gas turbine, wherein the gas turbine drives an electric generator thereby producing electricity. Conventional gas turbine operating apparatus and conditions may be used. The oxygen-containing gas is preferably air as this removes the need for an ASU and improves the effectiveness of the gas turbine. The turbine injection temperature may, if desired, be controlled by steam addition rather than using excess air. In one embodiment, the gas turbine fuel gas may be saturated using a saturator fed with a stream of heated water under pressure or steam may be directly injected into the gas turbine fuel. However, steam need not be added to the gas turbine feed to suppress $NO_x$ formation when air is used as the oxygen-containing gas in the secondary reforming step.

Whereas it is envisioned that the process of the present invention will be operated to maximise $CO_2$ capture, the process may also be operated whereby a portion of the hydrocarbon feed stream is fed to the gas turbine such that the exhaust gas from the heat recovery steam generation stage comprises carbon dioxide at levels below the permissible carbon dioxide emissions limit for the process. In operating the process in this way, the portion of hydrocarbon fed to the gas turbine may be $\leq 50\%$ vol, preferably $\leq 25\%$ volume, preferably $\leq 10\%$ volume of the hydrocarbon feed stream.

The gas turbine comprises an air compressor, combustor and turbine connected to a generator for generating electrical power. The turbine exhaust gas is used to generate steam, which is fed to one or more steam turbines connected to one or more generators to produce additional electricity. Thus, in addition to electricity generation from the gas turbine, electricity is also generated by one or more steam turbines fed by a heat recovery steam generator (HRSG) using the heat in the exhaust gas from the gas turbine. Preferably the heat recovery steam generation system generates high-pressure, intermediate-pressure and low-pressure steam fed to high-pressure, intermediate-pressure and low-pressure steam turbines. High and intermediate pressure steam generated by heat exchange of the reformed and shifted gas mixtures with water and/or steam under pressure may also be fed to the steam turbines if desired. Furthermore the exhaust gas from the gas turbine may, if desired, be used to heat one or more process fluid streams including the oxygen-containing gas fed to the autothermal reformer as well as boiler feed water at pressure.

If it is desired to increase the temperature of the exhaust gas, this may be done using a burner fed with a portion of the exhaust gas, which contains oxygen, and a suitable portion of a fuel stream selected from the hydrocarbon feed, the hydrogen-containing fuel gas or a mixture of these, although again burning hydrocarbon to do so is less preferred where it is desired to maximise the carbon capture.

Typically, the heat recovery unit is a heat recovery and steam generator unit (HRSG) that generates and superheats additional steam for use in the steam turbine and elsewhere in the process of the present invention. Thus, in addition to superheating steam and heating any process streams such as the air feed stream and the high pressure water feed to the waste heat boiler(s), the HRSG is capable of generating high pressure (HP) steam, medium pressure (MP) steam and low pressure (LP) steam and of superheating these steam streams. The HRSG may also be capable of reheating MP steam that is produced as an exhaust stream from the high-pressure stage of a multistage steam turbine.

The HRSG will typically comprise a plurality of heating coils through which the various process streams may be passed in heat exchange relationship with the exhaust gas. The exhaust gas preferably enters the HRSG at a temperature in the range 650-800° C., preferably 740-780° C. A conventional HRSG arrangement may be used wherein the exhaust gas contacts the heating coils for the production of and superheating of the HP, MP and LP steam, and for heating boiler feed water. The exhaust gas will be progressively cooled as it is heat exchanged with the various process streams. Typical final exhaust gas temperatures will be about 150° C. to avoid any dewing and corrosion associated with sulphur compounds in the gas.

Preferably, the superheated HP steam that is produced in the HRSG is at a pressure in the range 80 to 200 barg and a temperature in the range 450 to 600° C. Preferably, the superheated MP steam that is generated in the HRSG is at a pressure in the range 25 to 50 barg and a temperature in the range 300 to 450° C. Preferably, the superheated LP steam that is generated in the HRSG is at a pressure in the range 2 to 10 barg and a temperature in the range 200 to 300° C.

The cooled exhaust gas is discharged from the HRSG to the atmosphere through a stack. Preferably, the stack is provided with a continuous emission monitoring system for monitoring, for example, the NOx content of the cooled exhaust gas. The HP steam that is generated and superheated in the HRSG may be mixed with the HP steam from the waste heat boiler(s) (that is superheated in the HRSG) and the combined superheated HP steam passed to the HP stage of the steam turbine. If desired, a first portion of the MP steam exhaust from the high pressure stage of the steam turbine may be fed to the MP reheater coil of the HRSG and the re-heated MP steam then delivered to the medium pressure stage (middle stage) of the steam turbine. If desired, a second portion of the MP steam exhaust from the high pressure stage of the steam turbine may be used as MP steam for the steam reforming and water-gas shift conversion of the fuel feed stream and optionally to strip impurities from the process condensate.

Where the $CO_2$ recovery uses a physical or amine wash solvent as sorbent, a portion of the LP steam generated in the HRSG may, if desired, be used to heat and thereby desorb $CO_2$ out of the sorbent. However, preferably the LP steam is superheated in the HRSG and is delivered to the low pressure stage (final stage) of the steam turbine. The physical or amine wash may then be heated in a re-boiler in exchange with the reformed gas.

Thus the present invention offers a process for the conversion of natural gas to $CO_2$ and electrical power comprising subjecting a gas mixture comprising natural gas and steam to an integrated reforming process including stages of steam reforming in a gas-heated reformer and autothermal reforming to generate a reformed gas mixture, increasing the hydrogen content of the reformed gas mixture by subjecting it to one or more water-gas-shift stages, cooling the resulting hydrogen-enriched reformed gas and separating condensed water therefrom, passing the resulting de-watered hydrogen-enriched reformed gas to one or more stages of carbon dioxide separation to recover carbon dioxide, combusting the remaining hydrogen-containing fuel stream with an oxygen containing gas in a gas turbine to generate electrical power and passing the exhaust gas mixture from the gas turbine to a heat recovery steam generation system that feeds one or more steam turbines to generate additional electrical power.

In FIG. 1 a natural gas stream comprising >85% vol methane fed via line 10 is mixed with a hydrogen-containing stream 12 such that the resulting mixture contains between 1 and 5% vol hydrogen. The hydrogen-containing natural gas stream is fed via line 14 to heat exchangers 16 and 18. The heated natural gas mixture in line 20 is mixed with steam fed from line 22 at a steam to carbon ratio of about 1.5. The steam is generated in a steam stripper 24 fed with water 26 and a condensate stream 28. Alternatively, steam may be provided by feeding the heated natural gas stream to a saturator fed with a stream of heated water under pressure (not shown). The natural gas/steam mixture is heated in heat exchanger 30 and fed via line 32 to a plurality of externally-heated tubes 34, containing a pelleted nickel-based steam reforming catalyst, in gas-heated reformer 36. Whereas only one tube is depicted, typically there will be tens or hundreds of tubes. The methane is steam reformed and higher hydrocarbons converted to methane as the mixture passes over the Ni steam reforming catalyst. The resulting primary reformed gas mixture is then fed directly via line 38 to the burner region of an autothermal reformer 40, where it is partially combusted with air fed via line 42 that has been preheated in heat exchanger 44. The hot combusted gas mixture is brought towards equilibrium over a fixed bed of a pelleted nickel-based secondary reforming catalyst 46 disposed below the combustion zone in the autothermal reformer 40. The resulting hot secondary reformed gas mixture is fed from the autothermal reformer 40 via line 48 to the shell side of the gas-heated reformer 36. The hot secondary reformed gas mixture heats the external surfaces of the tubes 34 in the gas-heated reformer, thereby providing the heat for the steam reforming reactions. The resulting partially cooled secondary reformed gas mixture is fed from the shell side of the gas-heated reformer 36 to heat exchanger 30 where it is used to heat the reformer feed stream 32. The secondary reformed gas is fed from heat exchanger 30 via line 50 to heat exchanger 51 where its temperature is adjusted before it is fed via line 52 to a first shift vessel 54 containing a fixed bed of particulate iron-based high temperature shift catalyst 56. The water-gas shift reaction whereby the hydrogen content of the reformed gas is increased and the carbon monoxide converted to carbon dioxide occurs as the gas passes through the bed. The partially shifted reformed gas is fed from the first shift reactor 54 through a first stage of heat exchange in which it is cooled with water under pressure in heat exchanger 58. It is then further cooled by heat exchange with the hydrocarbon/hydrogen mixture in heat exchanger 18 before being fed via line 60 to a second shift vessel 62 containing a fixed bed of a particulate copper-based low-temperature shift catalyst 64. The water-gas shift reaction moves further to completion as the gas passes through the bed. The resulting hydrogen-enriched shifted gas mixture is then cooled. A portion is cooled in heat exchange with the hydrocarbon/hydrogen feed stream in heat exchanger 16 and the remaining portion in heat exchange with water under pressure in heat exchangers 65 and 66. The cooling lowers the temperature of the gas mixture to below the dew point so that water condenses. The combined cooled stream is fed to a separator 68 in which the condensate is separated from the gas mixture. The condensate stream is fed from the separator 68 to the steam stripper 24 via line 28. In this way volatile organics formed during the reforming and shift stages may be returned to the process. The dewatered gas mixture is fed from the separator 68 via line 70 to an acid gas removal system (AGRS) 72 operating with a solvent wash system that absorbs $CO_2$ from the gas. The absorbed $CO_2$ is recovered from the solvent in the AGRS 72 and then sent via line 74 for compression and storage. A hydrogen-containing fuel gas stream 76 is recovered from the AGRS. A portion of the hydrogen-containing fuel stream 76 is fed via line 12 to the natural gas feed stream. The remaining portion is passed to a gas turbine 78 where it combusted with air fed via line 80 and the combustion gases passed through a turbine connected to a generator (not shown) to generate electrical power. The exhaust gases from the gas turbine 78 are fed via line 82 to a heat recovery steam generator (HRSG) 84 comprising a plurality of coils fed with boiler feed water and steam, so that the HRSG produces a high pressure steam stream 86, a medium or intermediate pressure steam stream 88 and a low pressure steam stream 90, each of which are fed a steam turbine unit 92, which is connected to a generator (not shown) to generate additional electrical power. The spent, cooled exhaust gases from the HRSG, comprising mainly nitrogen and water vapour with some oxygen, are fed to a NOx-monitored stack via line 94.

If desired, a portion of the hydrogen-containing fuel gas may by-pass the gas turbine 78 and be fed to the HRSG via dotted line 96 where it is combusted with the exhaust gas 82 to heat the exhaust gas to a desired higher temperature.

In an alternative embodiment, the steam addition is not by direct injection but rather by feeding at least a portion of the heated natural gas stream to a saturator. Thus, the heated natural gas stream 20 is split into two portions and first major portion is fed to a saturator where it is contacted with a re-circulated stream of heated water under pressure. The saturated natural gas recovered from the saturator is then combined with the remaining portion of the natural gas feed and the combined mixture fed via heat exchanger 30 to the gas-heated reformer 36. The re-circulated water, which may be replenished by boiler feed water and/or process condensate, is desirably heated in exchange with the reformed gas mixture, for example in heat exchanger 51.

In normal operation, the process is operated such that all the natural gas feed is reformed and all the $CO_2$ is captured via line 74. In one embodiment, a portion of the natural gas feed in line 10 may be fed via dotted line 98 to the gas turbine 78 where it is combusted to generate electricity. In this case, the exhaust gases from the HRSG will comprise $CO_2$ and so the amount of hydrocarbon used in this way should be maintained below accepted emission levels.

EXAMPLE

The invention is further illustrated by the following calculated example of a process in accordance with the flowsheet depicted in FIG. 1. In the following tables, the pressures (P, in bar abs.), temperatures (T, in ° C.) and flow rates (kmol/h) are quoted, rounded to the nearest integer.

| Stream | | 10 | 12 | 20 | 22 | 32 | 38 | 42 | 48 | 50 |
|---|---|---|---|---|---|---|---|---|---|---|
| | Deg C. | 40 | 92 | 135 | 275 | 450 | 731.5 | 450 | 980 | 405 |
| | kPa | 4500 | 4400 | 3850 | 4000 | 3750 | 3355 | 3950 | 3290 | 3220 |
| | kgmole/h | 4300 | 110 | 4410 | 7094 | 11513 | 14337 | 10026 | 28584 | 28584 |
| | kg/h | 79565 | 222.5 | 79787 | 127692 | 207734 | 207734 | 290415 | 498148 | 498148 |
| Component Mole % | | | | | | | | | | |
| Methane | | 87.45 | 0.00 | 85.27 | 0.00 | 32.77 | 22.23 | 0.00 | 0.54 | 0.54 |
| Ethane | | 6.98 | 0.00 | 6.81 | 0.00 | 2.60 | 0.00 | 0.00 | 0.00 | 0.00 |
| Propane | | 2.19 | 0.00 | 2.14 | 0.00 | 0.82 | 0.00 | 0.00 | 0.00 | 0.00 |
| Butane | | 0.41 | 0.00 | 0.40 | 0.00 | 0.15 | 0.00 | 0.00 | 0.00 | 0.00 |
| Pentane | | 0.05 | 0.00 | 0.05 | 0.00 | 0.00 | 0.00 | 0.00 | 0.00 | 0.00 |
| Hexane | | 0.02 | 0.00 | 0.02 | 0.00 | 0.00 | 0.00 | 0.00 | 0.00 | 0.00 |
| H2O | | 0.00 | 0.00 | 0.00 | 100.00 | 61.62 | 34.21 | 0.00 | 19.75 | 19.75 |
| CO2 | | 1.91 | 0.00 | 1.86 | 0.00 | 0.71 | 6.20 | 0.03 | 4.11 | 4.11 |
| CO | | 0.00 | 0.00 | 0.00 | 0.00 | 0.00 | 4.38 | 0.00 | 12.18 | 12.18 |
| Hydrogen | | 0.00 | 100.00 | 2.50 | 0.00 | 0.96 | 32.68 | 0.00 | 35.57 | 35.57 |
| Nitrogen | | 0.99 | 0.00 | 0.97 | 0.00 | 0.37 | 0.30 | 78.09 | 27.53 | 27.53 |
| Oxygen | | 0.00 | 0.00 | 0.00 | 0.00 | 0.00 | 0.00 | 20.95 | 0.00 | 0.00 |
| Argon | | 0.00 | 0.00 | 0.00 | 0.00 | 0.00 | 0.00 | 0.93 | 0.33 | 0.33 |

| Stream | | 52 | 60 | 28 | 70 | 74 | 76 | 80 | 82 |
|---|---|---|---|---|---|---|---|---|---|
| | Deg C. | 360 | 215 | 50 | 50 | 55 | 55 | 25 | 746 |
| | kPa | 3195 | 3140 | 3090 | 3090 | 11000 | 3020 | 101 | 175 |
| | kgmole/h | 28584 | 28584 | 2400 | 26184 | 4164 | 22020 | 92783 | 107920 |
| | kg/h | 498148 | 498148 | 43311 | 454837 | 183267 | 271567 | 2687449 | 2958762 |
| Component Mole % | | | | | | | | | |
| Methane | | 0.54 | 0.54 | 0.00 | 0.59 | 0.00 | 0.70 | 0.00 | 0.00 |
| Ethane | | 0.00 | 0.00 | 0.00 | 0.00 | 0.00 | 0.00 | 0.00 | 0.00 |
| Propane | | 0.00 | 0.00 | 0.00 | 0.00 | 0.00 | 0.00 | 0.00 | 0.00 |
| Butane | | 0.00 | 0.00 | 0.00 | 0.00 | 0.00 | 0.00 | 0.00 | 0.00 |
| Pentane | | 0.00 | 0.00 | 0.00 | 0.00 | 0.00 | 0.00 | 0.00 | 0.00 |
| Hexane | | 0.00 | 0.00 | 0.00 | 0.00 | 0.00 | 0.00 | 0.00 | 0.00 |
| H2O | | 19.75 | 12.78 | 99.88 | 0.48 | 0.00 | 0.57 | 0.00 | 12.59 |
| CO2 | | 4.11 | 11.08 | 0.12 | 16.40 | 100.00 | 0.59 | 0.03 | 0.62 |
| CO | | 12.18 | 5.21 | 0.00 | 1.38 | 0.00 | 1.64 | 0.00 | 0.00 |
| Hydrogen | | 35.57 | 42.53 | 0.00 | 50.74 | 0.00 | 60.33 | 0.00 | 0.00 |
| Nitrogen | | 27.53 | 27.54 | 0.00 | 30.06 | 0.00 | 35.75 | 78.09 | 74.43 |
| Oxygen | | 0.00 | 0.00 | 0.00 | 0.00 | 0.00 | 0.00 | 20.95 | 11.45 |
| Argon | | 0.33 | 0.33 | 0.00 | 0.36 | 0.00 | 0.43 | 0.93 | 0.91 |

| | | Stream | | | |
|---|---|---|---|---|---|
| | | 94 | 86 | 88 | 90 |
| | Deg C. | 150 | 565 | 325 | 250 |
| | kPa | 130 | 16000 | 2190 | 400 |
| | kgmole/h | 107920 | 38700 | 38700 | 51070 |
| | kg/h | 2958762 | 697190 | 697190 | 920000 |
| Component Mole % | | | | | |
| Methane | | 0.00 | 0.00 | 0.00 | 0.00 |
| Ethane | | 0.00 | 0.00 | 0.00 | 0.00 |
| Propane | | 0.00 | 0.00 | 0.00 | 0.00 |
| Butane | | 0.00 | 0.00 | 0.00 | 0.00 |
| Pentane | | 0.00 | 0.00 | 0.00 | 0.00 |
| Hexane | | 0.00 | 0.00 | 0.00 | 0.00 |
| H2O | | 12.59 | 100.00 | 100.00 | 100.00 |
| CO2 | | 0.62 | 0.00 | 0.00 | 0.00 |
| CO | | 0.00 | 0.00 | 0.00 | 0.00 |
| Hydrogen | | 0.00 | 0.00 | 0.00 | 0.00 |
| Nitrogen | | 74.43 | 0.00 | 0.00 | 0.00 |
| Oxygen | | 11.45 | 0.00 | 0.00 | 0.00 |
| Argon | | 0.91 | 0.00 | 0.00 | 0.00 |

The invention claimed is:

1. A process for the conversion of a hydrocarbon to $CO_2$ and electrical power comprising the steps of:
   (i) subjecting a gas mixture comprising a hydrocarbon feed stream and steam to steam reforming by passing the mixture over a catalyst disposed in externally-heated tubes in a gas-heated reformer to form a primary reformed gas,
   (ii) partially combusting the primary reformed gas with a first oxygen-containing gas, and bringing the resultant partially combusted gas towards equilibrium over a secondary reforming catalyst in an autothermal reformer to form a secondary reformed gas mixture comprising hydrogen, steam and carbon oxides,
   (iii) passing the secondary reformed gas mixture without intermediate cooling to the gas-heated reformer to heat the tubes therein and form a partially cooled reformed gas mixture,
   (iv) increasing the hydrogen content of the partially cooled reformed gas mixture by subjecting it to one or more water-gas-shift stages thereby producing a hydrogen enriched reformed gas,
   (v) cooling the hydrogen-enriched reformed gas to below a dew point of the steam therein to condense water and separating condensed water to give a de-watered hydrogen-enriched reformed gas,
   (vi) passing the de-watered hydrogen-enriched reformed gas to one or more stages of carbon dioxide separation to generate a carbon dioxide stream and a hydrogen-containing fuel stream, and
   (vii) combusting the hydrogen-containing fuel stream with a second oxygen-containing gas in a gas turbine to generate electrical power and an exhaust gas mixture and passing the exhaust gas mixture to a heat recovery steam generation system to provide steam for one or more steam turbines and generate additional electrical power.

2. A process according to claim 1 wherein the hydrocarbon feed comprises >85% by volume methane.

3. A process according to claim 1 wherein a portion of the hydrogen-containing fuel stream is mixed with the hydrocarbon feed stream prior to mixing with steam.

4. A process according to claim 1 wherein the hydrocarbon feed stream is heated prior to primary reforming by heat exchange with the hydrogen-enriched reformed gas.

5. A process according to claim 1 wherein the hydrocarbon and steam mixture is heated prior to steam reforming by heat exchange with the partially cooled reformed gas mixture.

6. A process according claim 1 wherein the oxygen containing gas fed to the autothermal reformer is air.

7. A process according to claim 1 wherein the partially cooled reformed gas is subjected to two or more water gas shift stages selected from the group consisting of a high temperature shift stage, a medium temperature shift stage, a low temperature shift stage, and combinations thereof.

8. A process according to claim 1 wherein the condensed water is fed to a steam generator to provide at least a portion of the steam required for steam reforming.

9. A process according to claim 1 wherein the carbon dioxide separation stage is performed using an amine- or physical wash- solvent system.

10. A process according to claim 1 wherein the carbon dioxide separation stage is performed using a membrane system.

11. A process according to claim 1 wherein the oxygen-containing gas fed to the gas turbine is air.

12. A process according to claim 1 wherein a portion of the hydrocarbon feed stream is fed to the gas turbine.

13. A process according to claim 12 wherein the portion of hydrocarbon fed to the gas turbine is ≤50% volume of the hydrocarbon feed stream.

14. A process according to claim 1 wherein the heat recovery steam generation system generates high-pressure, intermediate-pressure and low-pressure steam fed to high-pressure, intermediate-pressure and low-pressure steam turbines.

15. A process according to claim 1 wherein the recovered carbon dioxide is compressed and used for the manufacture of chemicals, or sent to storage or used in enhanced oil recovery processes.

16. A process according to claim 12 wherein the portion of hydrocarbon fed to the gas turbine is ≤25% volume of the hydrocarbon feed stream.

17. A process according to claim 12 wherein the portion of hydrocarbon fed to the gas turbine is ≤10% volume of the hydrocarbon feed stream.

* * * * *